Sept. 27, 1938.  A. JOHNSON  2,131,439
MACHINE FOR COOLING CREAM AND LIKE PRODUCTS
Filed June 11, 1936  2 Sheets-Sheet 1
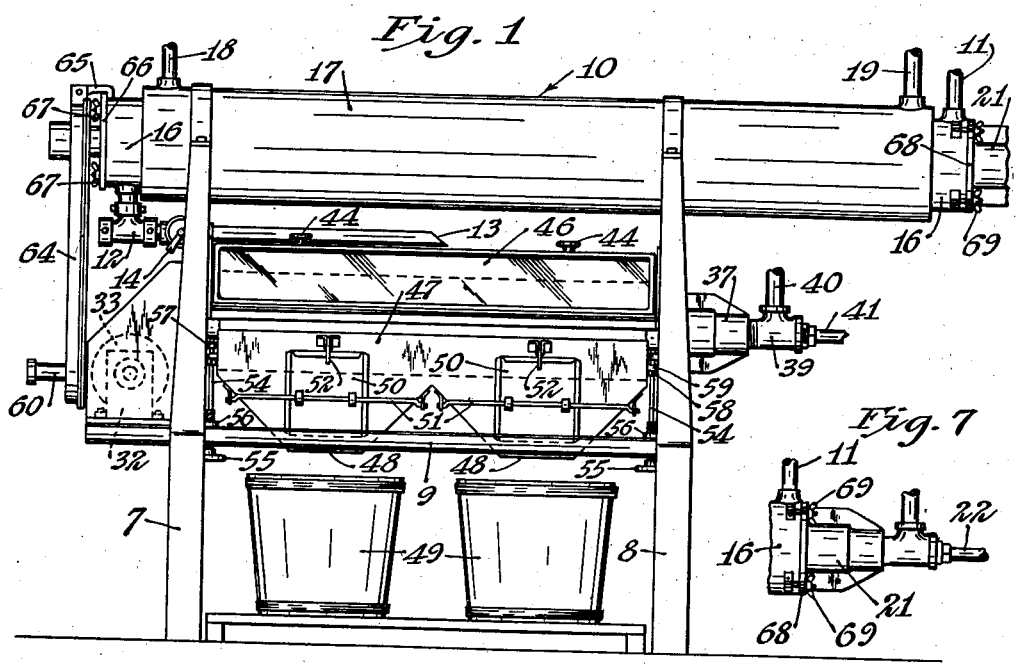
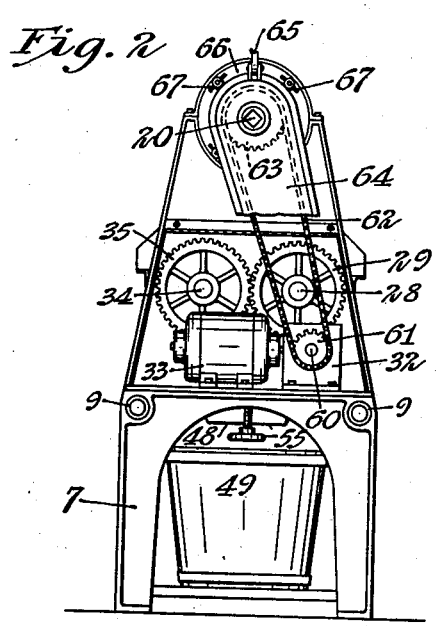
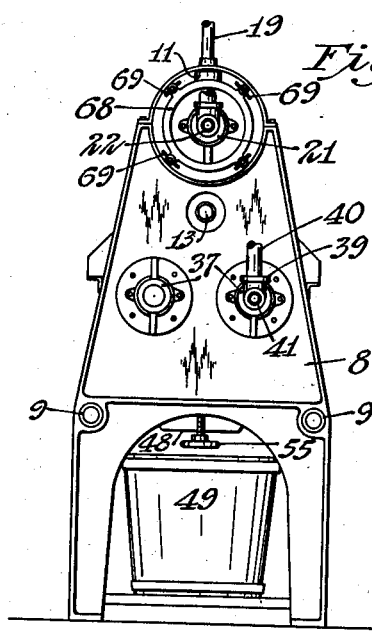
Inventor
Alex Johnson
By Stryker & Stryker
Attorneys Sept. 27, 1938.　　　　　A. JOHNSON　　　　　2,131,439
MACHINE FOR COOLING CREAM AND LIKE PRODUCTS
Filed June 11, 1936　　　2 Sheets-Sheet 2
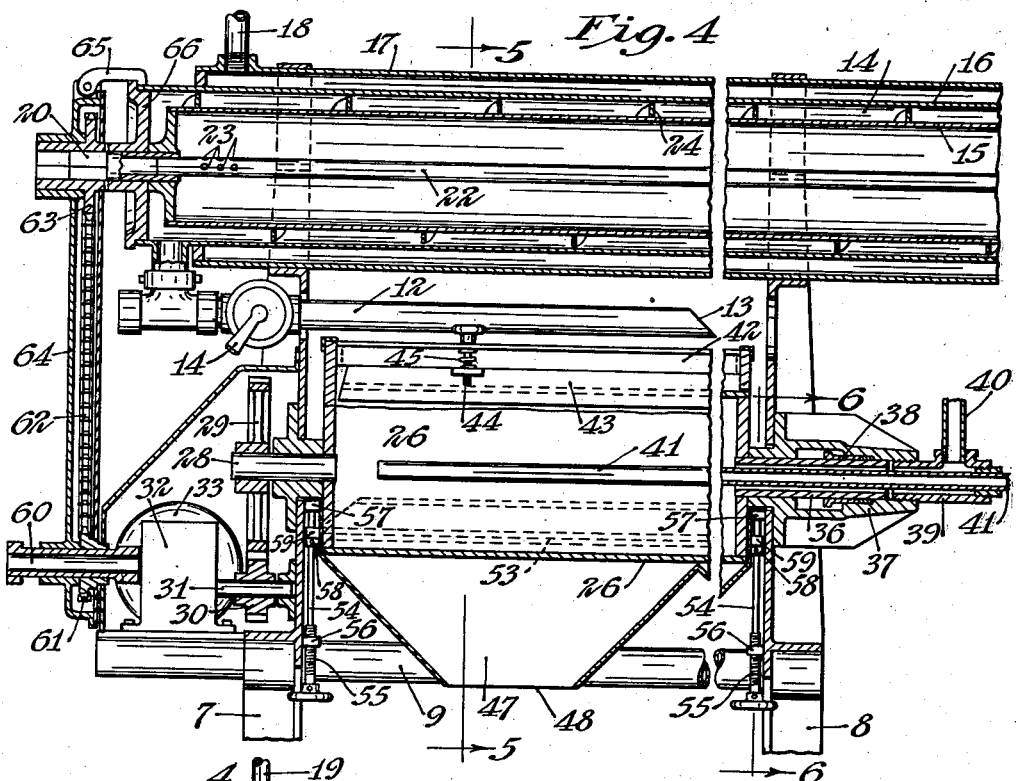
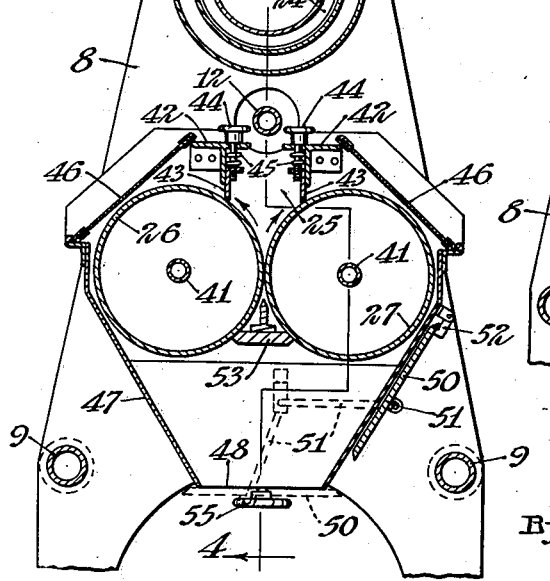
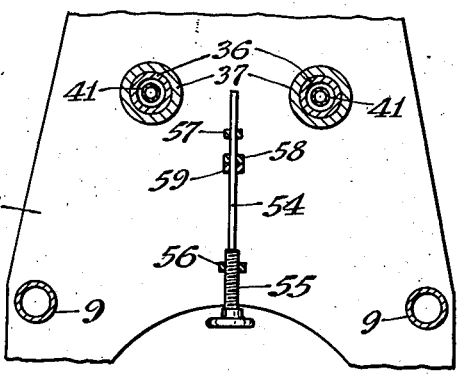
Inventor
Alex Johnson
By Stryker & Stryker
Attorneys Patented Sept. 27, 1938

2,131,439

UNITED STATES PATENT OFFICE 2,131,439

MACHINE FOR COOLING CREAM AND LIKE PRODUCTS

Alex Johnson, Minneapolis, Minn., assignor to Land O'Lakes Creameries, Inc., Minneapolis, Minn., a corporation of Minnesota Application June 11, 1936, Serial No. 84,629

4 Claims. (Cl. 62—114)

It is an object of this invention to provide a novel machine particularly, although not exclusively, adapted for cooling thick cream and like concentrated or semi-solid products.

A particular object of the invention is to improve the efficiency and eliminate a number of the operating difficulties heretofore encountered in cooling cream having a high percentage of butter fat by a novel arrangement of cylindrical cooling members, supply trough and scrapers whereby the product is cooled on the exterior and readily accessible surfaces of the cylindrical members and is forcibly removed therefrom.

Another object is to provide a cooler, particularly for creamery products and other food, having all surfaces that come in contact with the product readily accessible for cleaning and sterilization.

The invention also includes certain other novel features of construction and a novel process whereby more rapid and efficient cooling is accomplished.

Referring to the accompanying drawings, which illustrate the best form of my machine at present known to me:

Figure 1 shows the machine in side elevation;

Fig. 2 is an elevation of the same as viewed further left of Fig. 1, and with a portion of the casing broken away to show the driving mechanism;

Fig. 3 is an elevation of the machine as viewed from the right of Fig. 1;

Fig. 4 is an irregular section taken approximately on the line 4—4 of Fig. 5;

Fig. 5 is a section taken on the line 5—5 of Fig. 4;

Fig. 6 is a fragmentary section taken on the line 6—6 of Fig. 4, and

Fig. 7 is a detail showing certain connections for circulating a cooling medium in the upper unit.

The machine has a frame consisting of standards 7 and 8 rigidly connected together in spaced parallel relation to each other by a pair of tubular frame members 9. Extending horizontally at the top of the machine is a cooling unit indicated generally by the numeral 10. This unit or part of the machine is similar to the Heat transfer apparatus for semi-solid products, described and claimed in my Patent No. 1,949,374, dated February 27, 1934. The cream or other product to be cooled is admitted to the cooling unit 10 through an inlet pipe 11 and is discharged therefrom through a pipe 12 having an open end 13. The flow of cream from the pipe 12 is controlled by a valve 14.

An initial stage of cooling of the product takes place in an annular space 14 between an inner cylindrical casing 15 and an outer cylindrical casing 16 of the unit 10. The outer casing 16 is coaxial with the casing 15 and has a jacket 17 to receive a suitable cooling medium, such as brine or cold water. The cooling medium is admitted to one end of the jacket through a pipe 18 and discharged from the opposite end through a pipe 19. The inner casing 15 is arranged to be rotated and has an axial shaft 20 projecting through a suitable bearing in one end of the casing 16. At the opposite end, a hollow axial shaft 21 projects from the casing 15 and is provided with a suitable journal bearing in the stationary casing 16. The hollow shaft 21 affords an outlet for a cooling medium which is conducted axially into the inner casing 15 through a pipe 22. This pipe extends axially through the shaft 21 and within the casing 15 and has outlet openings 23 at the end of the casing 15 remote from the shaft 21. A suitable journal bearing for the inner end of the pipe 22 is formed at the inner end of the shaft 20. The cream is moved in the space 14 by a spiral conveyor member 24 fixed on the periphery of the casing 15 so that the product is thoroughly stirred, spread on the cooling surfaces and then removed therefrom and delivered into the outlet pipe 12.

The pipe 12 delivers the partially cooled cream into a trough, indicated generally by the numeral 25, adapted to distribute the product upon the outer peripheries of cylinders 26 and 27. These cylinders are disposed with their axes horizontal and have axial supporting shafts journaled in the standards 7 and 8. The cylinder 27 has a drive shaft 28 projecting from one end. A gear 29 is fixed on the shaft 28 to be driven by a pinion 30 on a shaft 31 projecting from suitable speed reducing gears in a casing 32. An electric drive motor 33 is operatively connected to the gears in the casing 32. An axial drive shaft 34 is provided for the cylinder 26 (Fig. 2) and this shaft has a driving gear 35 driven directly from the gear 29 on the shaft 28.

A hollow shaft 36 supports the end of the cylinder 27 remote from the shaft 28 and this shaft 36 is journaled in a bearing 37 mounted on the standard 8. To seal the joint between the shaft 36 and bearing 37, a packing gland 38 is provided. Connections for circulating a cooling medium in the cylinder 27 include a T-fitting 39 having one branch communicating with the interior of the hollow shaft 36 and another branch fitted with a pipe 40 for conducting the cooling medium out of the cylinder 27. Such a medium is admitted to the cylinder through an axial pipe 41 extending through the fitting 39 and shaft 36 communicating with the cylinder 27 near the shaft 28.

The cylinder 26 has connections for circulating the cooling medium similar to the connections for the cylinder 27 hereinbefore described. The cylinders 26 and 27 make rolling contact with each other, as indicated in Fig. 5, so that the trough 25 delivers the product to be cooled to the surfaces of these cylinders just above the line of contact between them. Extending horizontally in parallel relation to the cylinders 26 and 27 are supporting bars 42 for adjustable side walls 43. A pair of manually operable screws 44 are provided to actuate each of the walls 43 and are revolubly mounted in bearings attached to the bars 42 and threaded in bearings attached to the walls 43. Coiled springs 45 are so disposed on the several screws 44 as to thrust the lower edges of the walls 43 downward toward the cylinders respectively.

Transparent, removable covers 46 enclose the upper peripheries of the cylinders 26 and 27, and extending downward from these covers is the casing 47. The sides of this casing converge to a pair of bottom openings 48 adapted to deliver the product to suitable receptacles 49. Doors 50 for the openings 48 are mounted on hangers 51 adapted to permit the doors to be swung from their open positions indicated in full lines in Figs. 1 and 5 to the closed positions indicated in dotted lines in Fig. 5. The doors tend to swing by gravity to their closed positions, and catches 52 are provided to retain them in open position.

To remove the product from the peripheries of the cylinders 26 and 27, a stout scraper 53 is arranged to contact both cylinders from end to end. This scraper is supported at its ends on rods 54 (Figs. 4 and 6) which are integral with, and project axially from, manually operable screws 55. The screws 55 are threaded in bearings 56 secured to the standards 7 and 8 respectively and the upper ends of the rods 54 are slidable in bearings 57. Lugs 58, projecting from the ends of the scraper 53, are supported on heads 59 fixed on the rods 54. It will be readily undertsood that the pressure exerted by the scraper 53 against the cylinders 25 and 26 is adjustable by means of the screws 55.

To rotate the inner casing 15 and screw conveyor 24, power is transmitted from the motor 33 though gears in the casing 32 to a shaft 60. This shaft is fitted with a sprocket wheel 61 for driving a chain 62 which is trained on a sprocket wheel 63 fitting on a squared end of the shaft 20. The sprocket wheels 63 and 61 are enclosed in a suitable casing 62. This casing and the sprocket wheel 61 are slidable along the shaft 60 which projects, as best shown in Fig. 4. The sprocket wheel 63 is made readily detachable from the shaft 20 by providing a catch 65 pivoted on the casing 64 and engaging in a suitable nut in a head 66 on the casing 16. By merely releasing the catch 65 from the notch in the head 66, the assembly comprising the sprocket wheels, chain and casing are slidable to the left as seen in Fig. 4 far enough to permit the withdrawal of the square end of the shaft 20 from engagement with the sprocket wheel 63, whereupon the casing 64 and contents may be pivoted on the shaft 60 to permit the ready removal of the head 66. This is desirable to facilitate cleaning and sterilizing the interior of the unit 10. As shown in Figs. 1 and 2, the head 66 is held in place by stud bolts having wing nuts 67 which are readily removable. Similarly the opposite end of the casing 15 has a removable head 68 which is held in place by bolts having wing nuts 69.

Operation

I prefer to utilize cold water as the cooling medium in the unit 10 and brine or other refrigerant at a lower temperature in the second stage of cooling in the cylinders 26 and 27. The cold water is admitted through the pipe 18 and discharged from the pipe 19 for cooling the jacket 17 and is also admitted through the pipe 22 and discharged through the coaxial pipe 21 for circulation in the inner casing 15. Chilled brine is forced in through the pipes 41 to the interiors of the cylinders 26 and 27 and is discharged from the cylinders through the axial shaft 38, fitting 39 and pipe 40, as will be readily understood by workers in this art.

The cream or other product to be cooled is fed to the annular cooling space 14 through the pipe 11 and, impelled by the conveyor member 24, flows longitudinally of the casings 15 and 16, with a spiral motion, to the outlet pipe 12. This completes the first stage of cooling wherein the cream is somewhat thickened but remains in sufficiently fluid state to flow from the open end 13 of the pipe 12 into the trough 25.

The lower edges of the sides 43 of this trough are so spaced from the peripheries of the cylinders 26 and 27 as to permit the passage of a film or coating of cream of the proper thickness for the desired degree of cooling. It will be understood that these casings are rotated in the direction indicated by the arrows in Fig. 5 at such speed that the final cooling or chilling of the product is effected in the interval of time it requires for the coating of cream to reach the scraper 53. This scraper forcibly removes the coating from both cylinders so that a substantially solid product drops from the scrapers through the opening 48 into the receptacles 49. The operation is continuous and when one of the receptacles 49 is filled it is replaced by an empty one. During the interval of time required for the change from one receptacle to another, the doors 50 are closed merely by releasing the catches 52.

I have found that when handling a product which solidifies substantially and adheres to the cooling surfaces when chilled, distinct advantages are obtained if the final cooling step is effected as herein described on the exterior of the cylindrical refrigerating units. This facilitates the removal of the product from the chilled surfaces. However, the first stage of the cooling can be more economically performed in apparatus of the type exemplified by the unit 10, because the product before the final chilling is in a suitably liquid state. My arrangement of the two distinct types of cooling units also promotes economy and efficiency in the use of the cooling mediums or refrigerants because the inexpensive cold water can be utilized to best advantage in the initial stage and the lower temperatures required for the second stage of cooling only require the more expensive refrigerant.

Another important feature of my machine comprises the arrangement for readily cleaning and sterilizing the surfaces which come in contact with the product. As hereinbefore described, both ends of the casing 16 are readily removable, together with the inner casing 15, so that all of the interior surfaces of the unit 10 contacted by the cream may be readily cleansed. The removable covers 46 allow access to the surfaces of the cylinders 26 and 27 and trough 25 touched by the product and the scraper 53 is also removable for cleaning after merely withdrawing the supporting rods 54 downward as by suitable manipulation of the screws 55.

Having described my invention, what I claim is new and desire to protect by Letters Patent is:

1. Congealing apparatus for cream and like products comprising, a pair of horizontally extending cylindrical coolers disposed with their peripheries in rolling contact one with the other, a pair of oppositely disposed walls forming a receiving trough for the liquid to be cooled between them and above the contacting peripheries of said coolers, the lower edges of said walls being slightly spaced from the peripheries of said coolers respectively for spreading the product to be cooled over the upper peripheries of said coolers, means for removing a coating of said product from the peripheries of said coolers, a cooling medium, means for circulating the cooling medium within said coolers and power-driven means for rotating said coolers.

2. Congealing apparatus for cream and like products comprising, outer and inner cylinders having a cylindrical space between them for the product to be treated, axial supports for said cylinders, including journal bearings for said inner cylinder, means for admitting the product to be treated near one end of said cylindrical space, an outlet for said product near the opposite end of said space, a second pair of cylinders mounted beneath said outlet with their axes in horizontally spaced relation to each other, means for spreading the product on the peripheries of said last mentioned cylinders, means for removing the product from the peripheries of said cylinders, means for cooling all of said cylinders and power-driven means for rotating the inner cylinder of the first pair and both cylinders of the second pair.

3. Congealing apparatus for cream and like products comprising outer and inner cylinders having a cylindrical space between them for the product to be treated, axial supports for said cylinders, including journal bearings for said inner cylinder, means for admitting the product to be treated near one end of said cylindrical space, an outlet for said product near the opposite end of said space, a trough beneath said outlet, a second pair of cylinders mounted under said trough with their axes in horizontally spaced relation to each other, means on said trough to spread the product on the upper peripheries of said second pair of cylinders, means for removing the product from the peripheries of said cylinders, means for cooling all of said cylinders and power-driven means for rotating the inner cylinder of the first pair and both cylinders of the second pair.

4. In a machine for congealing cream and like products, a pair of cylinders mounted with their axes in horizontally spaced relation to each other, a trough mounted above said cylinders to receive the product to be cooled, said trough having oppositely disposed walls arranged in spaced relation to the peripheries of said cylinders respectively to spread the product thereon, means for adjusting the spacing of said walls from said cylinders respectively, a scraper arranged to engage the lower peripheries of said cylinders for removing the product therefrom, means for cooling said cylinders and power-driven means for rotating said cylinders.

ALEX JOHNSON.